United States Patent
Lamar, Jr.

[11] Patent Number: 6,165,044
[45] Date of Patent: Dec. 26, 2000

[54] POWER-DRIVEN MOTORIZED BULLDOZER

[76] Inventor: Tommy Lamar, Jr., 17 Hayes Rd., Cleaveland, Miss. 38732

[21] Appl. No.: 09/220,037

[22] Filed: Dec. 23, 1998

[51] Int. Cl.⁷ ................................................ G09B 25/00
[52] U.S. Cl. ........................ 446/427; 446/424; 446/431
[58] Field of Search .................................. 446/431, 433, 446/434, 424, 425, 427; 180/9.1; 188/16, 354

[56] References Cited

U.S. PATENT DOCUMENTS

| | | | |
|---|---|---|---|
| D. 261,787 | 11/1981 | Breneman | D21/132 |
| 261,787 | 11/1981 | Breneman | D21/132 |
| 2,586,239 | 2/1952 | MacKenzie | 446/427 |
| 2,698,667 | 1/1955 | Kropp . | |
| 2,896,367 | 7/1959 | Glass et al. | 446/427 |
| 3,308,573 | 3/1967 | Ryan | 446/427 |
| 3,738,057 | 6/1973 | Ogasawara . | |
| 3,744,181 | 7/1973 | Gagnon . | |
| 3,772,825 | 11/1973 | Gagnon | 446/433 |
| 4,417,523 | 11/1983 | Mariol | 105/1 T |
| 4,613,927 | 9/1986 | Brandt | 362/32 |
| 4,639,646 | 1/1987 | Harris | 318/139 |
| 4,673,370 | 6/1987 | Goldfarb | 446/162 |
| 5,005,921 | 4/1991 | Edwards | 305/35 EB |
| 5,447,204 | 9/1995 | Asal | 172/821 |
| 5,879,221 | 3/1999 | Barton et al. | 446/427 |

*Primary Examiner*—Jacob K. Ackun
*Assistant Examiner*—Bena B. Miller
*Attorney, Agent, or Firm*—Goldstein & Canino

[57] ABSTRACT

A power-operated mobile toy bulldozer that is capable of seating one person. The toy bulldozer comprises a central body frame having a front portion and a rear portion. The central body frame has a seat, a pair of mobility means mounting the central body frame, a pair of gear boxes having a plurality of gears, one of the plurality of gears mounting the mobility means, a movable blade mounted on the front portion of the central body frame, a movable ripper mounted on the rear portion of the central body frame, and a pair of brakes having brake shoes. The brake shoes press against the inner portion of the top end wheel of the mobility means when the pair of brake pedals connected to the brakes are activated. A power source on the central body frame is provided to supply electrical energy for operating the mobile toy bulldozer.

8 Claims, 3 Drawing Sheets

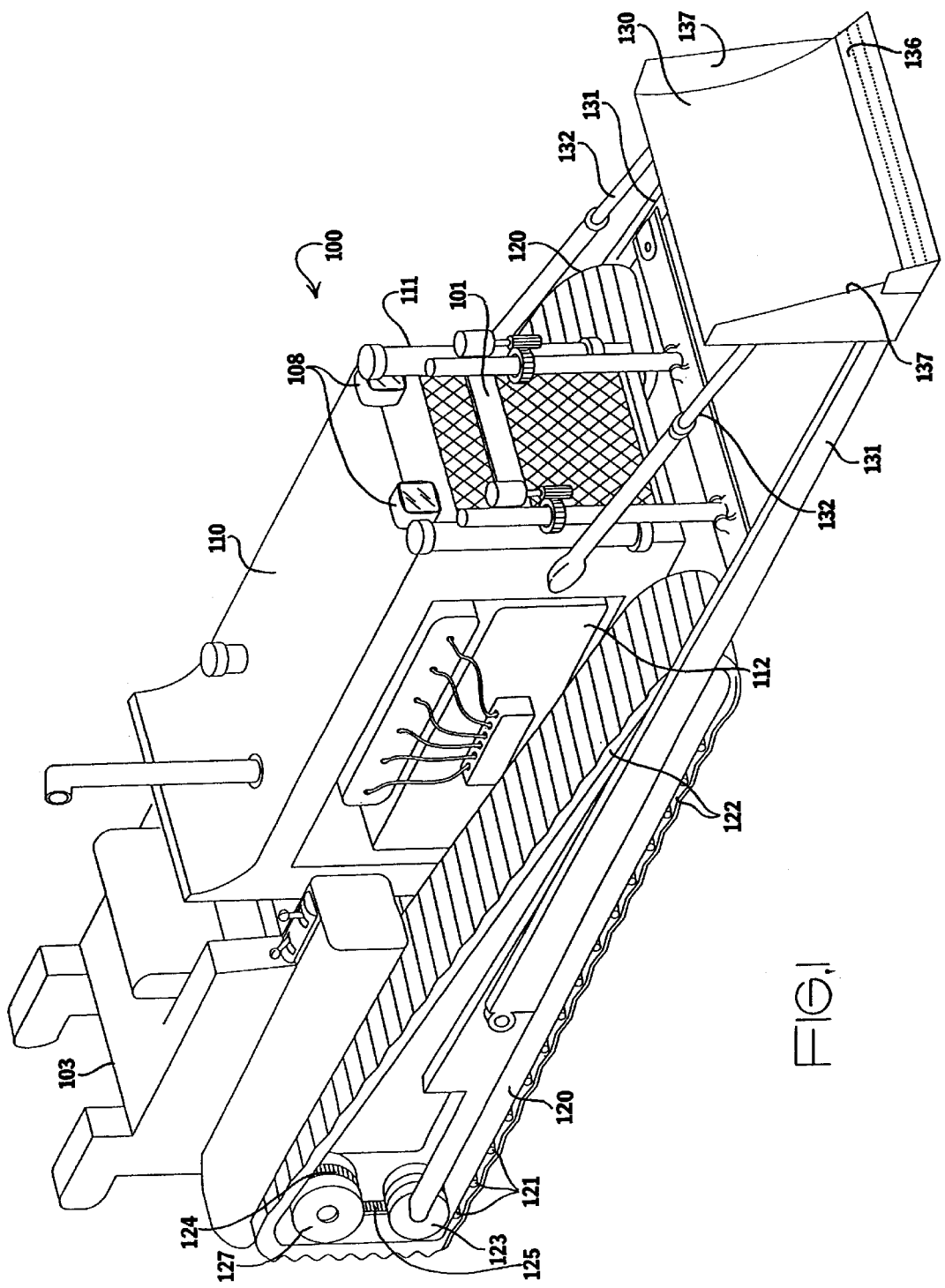

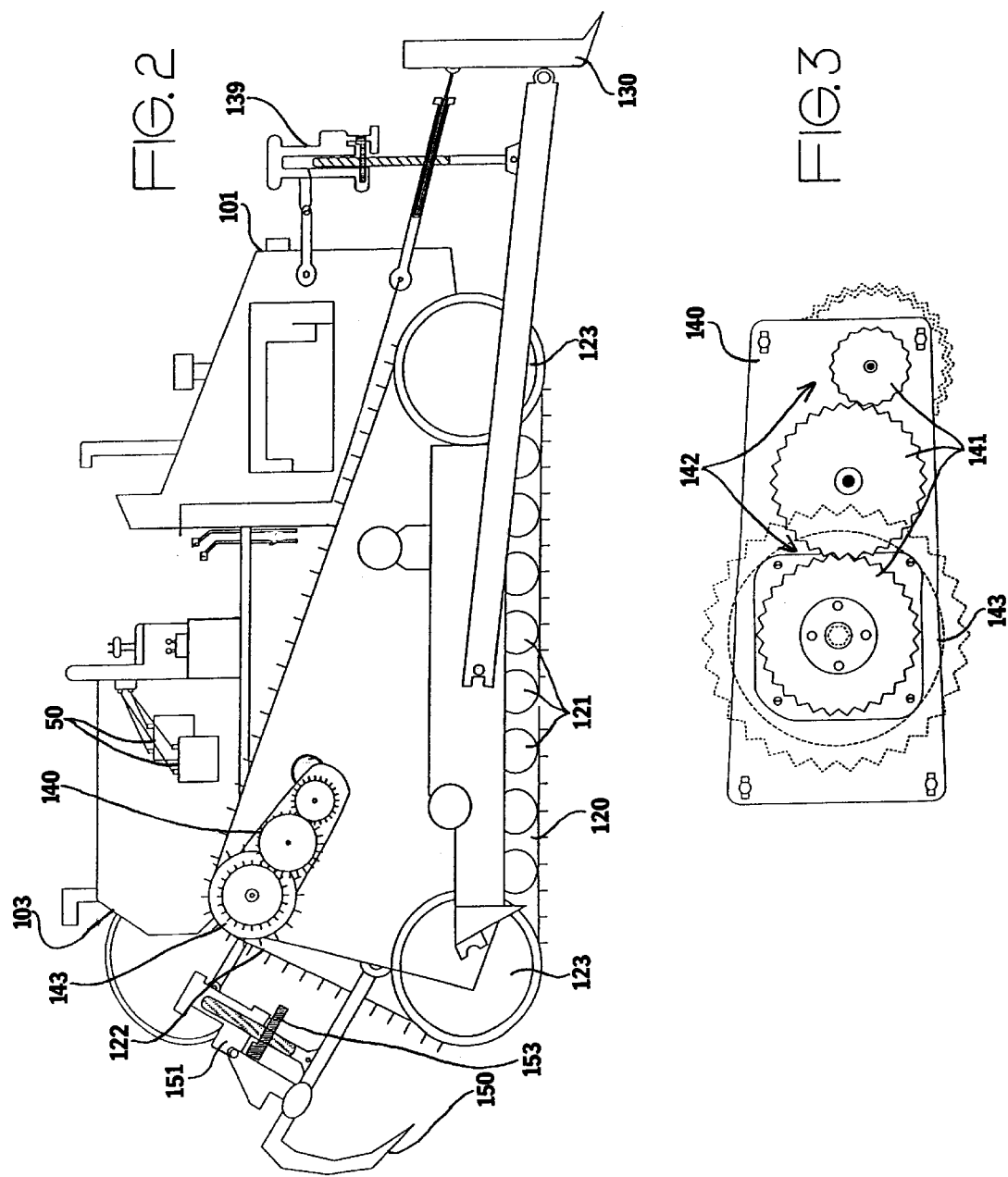

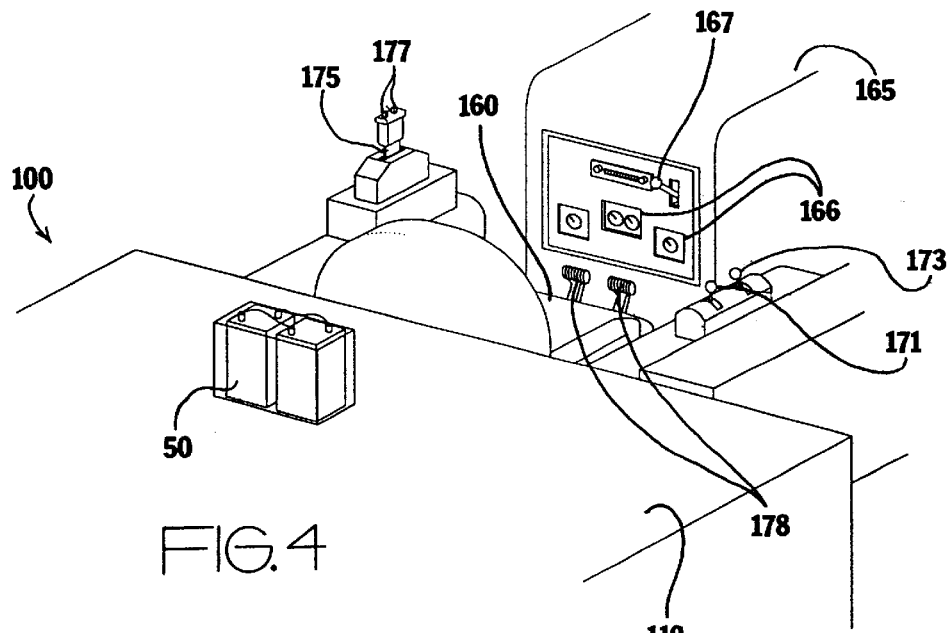
FIG. 4
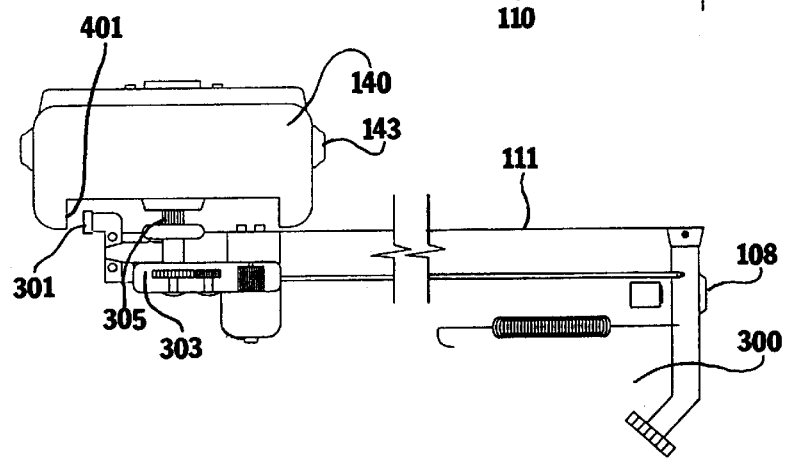
FIG. 5
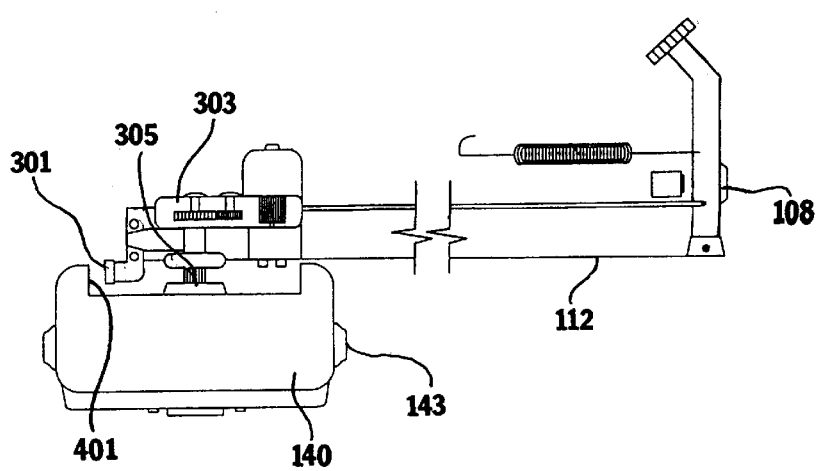

POWER-DRIVEN MOTORIZED BULLDOZER

BACKGROUND OF THE INVENTION

The present invention relates to a toy bulldozer. More particularly, the present invention relates to power-operated toy bulldozer that seats one person and is capable of moving from one location to another.

Motorized toys that resemble or mimic real-world vehicles are very popular with children. As a result, it is common to see toys resembling automobiles, motorcycles, boats, airplanes, amphibious tanks, etc. For example, U.S. Pat. No. 4,417,523 to Mariol discloses an electric motor driven toy train which comprises multiple cars that are articulated about a vertical axis and has one axle to minimize the turning radius of the train set.

U.S. Pat. No. 4,673,370 to Goldfarb et al. discloses an amphibious toy vehicle capable of operating along a solid surface in air and also capable of self-propulsion along a solid surface at the bottom of a body of water or along the top free surface of a body of water. U.S. Pat. No. 4,639,646 to Harris et al. discloses a battery-operated child's riding toy that is capable of being driven in the forward direction or in the reverse direction. While these toy vehicles are a convenient and fun way of teaching children about their full sized counterparts, they suffer from the drawback that these toy vehicles are incapable of seating children, which results in a less interesting experience for the children.

In addition to the above-mentioned drawbacks, the existing motorized toys fail to simulate the feeling of driving a real-world bulldozer. Real-world bulldozer assemblies are designed to perform various functions. For example, they are designed for leveling a flat surface wherein dirt and debris is pushed in front of the shovel and plow assembly. In other arrangements, the bulldozer assembly is designed so that a blade of the bulldozer can be angled in one direction or the other with respect to its travel path, thus directing the materials to one side or the other of the travel path of the bulldozer assembly. Accordingly, there is a need for a motorized toy that is similar to a real-world bulldozer and allows children the opportunity to learn about its operation and functionality.

While the existing toy vehicles mentioned above may be suitable for the particular purpose employed, or for general use, they are not as suitable for the purposes of the present invention as disclosed hereafter.

SUMMARY OF THE INVENTION

It is an object of the present invention to provide a toy that resembles a real-world bulldozer. Accordingly, a battery-powered toy bulldozer is disclosed that seats a person and is mobile.

It is another object of the invention to provide a battery powered toy bulldozer with a lever that allows the toy bulldozer to move in the forward and backward directions.

It is another object of the invention to provide a toy bulldozer that can travel on various different types of terrain. Accordingly, the toy bulldozer is provided with a closed-loop elastic track that is fitted around a plurality of roller wheels and supported by a plurality of end wheels.

It is yet another object of the invention to provide a toy bulldozer that is capable of lifting, moving, pulling or dragging objects such as sports equipment, teddy bears, books or the like. Accordingly, the toy bulldozer comprises a front blade and a rear ripper. The toy bulldozer is further provided with a pair of levers to control the front blade and the rear ripper.

It is another object of the present invention to provide a toy bulldozer with a pair of front headlights and a lever that controls operation of the headlights.

It is a still further object of the invention to provide a toy bulldozer that includes a braking mechanism for allowing the driver to bring the toy bulldozer to a halt.

To accomplish the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a diagrammatic perspective view of the toy bulldozer in accordance with the present invention.

FIG. 2 provides a right side elevational view with a portion of the side wall removed to show the internal components of the toy bulldozer.

FIG. 3 is an enlarged view of the gear box in the right side portion of the toy bulldozer as shown in FIG. 2.

FIG. 4 illustrates the seating area on the top portion of the toy bulldozer.

FIG. 5 illustrates the bottom portion of the toy bulldozer which is seen by removing the lower floor of the toy bulldozer.

DETAILED DESCRIPTION OF THE PREFERRED EMBODIMENTS

FIG. 1 illustrates a toy bulldozer 100. In accordance with the present invention, the toy bulldozer 100 has a central body frame 110 with a left side 111 and a right side 112. The central body frame is mounted on a pair of mobility means 120 on the left side 111 and the right side 112.

Referring to FIG. 1, the mobility means 120 has a closed-loop elastic track 122, a top end wheel 127 and a pair of bottom end wheels 123. The closed-loop elastic track 122 is constructed from a polymeric material to form a frictional drive surface that enables the toy bulldozer 100 to travel on a variety of different terrain. The closed-loop elastic track 122 is securely fitted on the top end wheel 127 and the pair of bottom end wheels 123, as shown in FIGS. 1 and 2. The top end wheel 127 and the bottom end wheels 123 have grooved bands 124. The inner surface of the closed-loop elastic track 122 has a slotted strip 125, which corresponds with the grooved bands 124. As a result of the slotted strip 125 connecting with the grooved bands 124, the closed-loop elastic track 122 rotates when the end wheels rotate.

The mobility means 120 is further provided with a plurality of idler wheels or rollers 121 positioned between the bottom end wheels 123, as shown in FIG. 2. The rollers 121 prevent the closed-loop elastic track 122 from coiling together. The rollers 121 are regularly spaced to provide even support to the closed-loop elastic track 122.

As shown in FIG. 2, each of the mobility means 120 is connected to a gear box 140 on the left side 111 and the right side 112 of the central body frame 110. The gear box 140 comprises a plurality of gears 141 having sprockets that interlock to form a gear train 142, as shown in FIG. 3. As is well known, the gear train 142 increases the mechanical advantage of the individual gears 141 by magnifying the effect of the force applied on them.

The gear train 142 has a rear gear 143 that mounts to the top end wheel 127, which causes the top end wheel 127 to rotate when the gear train 142 rotates.

The central body frame 110 has a pair of top arms 132 and bottom arms 131, which hold a blade 130 across the front portion 101 of the central body frame 110. The blade 130 is capable of pushing objects. To ensure that the blade 130 is able to scoop up objects, the blade 130 has two side walls 137 that connect to a bottom flange 136 such that the front portion of the blade 130 resembles the structure of a spade or a plow. As shown in FIG. 2, the toy bulldozer 100 has a front lift gear box 139 that is attached to the bottom arms 131. The front lift gear box 139 raises or lowers the bottom arms 131 to allow the blade 130 to move vertically up and down.

The toy bulldozer 100 has a ripper 150 on its rear portion 103, as shown in FIG. 2. The ripper 150 is connected to a ripper lifter 151 that is attached to a worm shaft 153. the worm shaft 153 is connected on the rear portion 103 of central body frame 110. The worm shaft 153 is capable of moving in vertical and horizontal planes, thereby causing the ripper 150 to move upward, downward, rearward and forward.

FIG. 4 provides a top view of the toy bulldozer 100, showing the seating area. The central body frame 110 has a seat 160.

The central body frame 110 has a console 165 directly in front of the seat 160. The console 165 has a plurality of gauges 166 that allows the driver to view the toy bulldozer's speed, etc. There is a headlight lever 167 on the console to turn on and off the toy bulldozer's headlights 108 (shown in FIG. 1).

The central body frame 110 is provided with a ripper lever 171, a blade lever 173, a movement control 175, and a pair of speed control buttons 177 next to the seat 160. The ripper lever 171 controls the ripper 150 at the rear portion 103 of the central body frame 110, while the blade lever 173 controls the blade 130 at the front portion 101 of the central body frame 110. The movement control 175 allows the driver to move the toy bulldozer 100 back and forth by pulling and pushing the movement control 175. According to the invention, when the movement control 175 is in its neutral position, the toy bulldozer 100 is not mobile. As a result, the user may halt motion by the toy bulldozer 100 by merely moving the movement control 175 to neutral.

The pair of speed control buttons 177 control the speed at which the toy bulldozer 100 travels. To ensure that the speed of the toy bulldozer 100 is within proper limits, the speed control buttons 177 are programmed with predetermined speed limits. The toy bulldozer 100 has a pair of brake pedals 178 that act to reduce the speeds on the left and right mobility means 120 (shown in FIG. 1).

FIG. 5 shows a portion of the central body frame's 110 bottom side 300. The bottom side 300 is provided with a pair of brakes 303 on the left side 11 and the right side 112. The brakes 303 are mounted with brake shoes 301. The brakes 303 are activated by the pair of brake pedals 178, shown in FIG. 4. When the pair of brake pedals 178 are activated by the driver, the brake shoes 301 move forward and press against the inner portion 401 of the top end wheel 127 on the left side 111 and the right side 112 of the central body frame 110 of the toy bulldozer 100.

As shown in FIG. 5, a pair of axles 305 are mounted to the bottom side 300. The pair of axles 305 mount the top end wheels 127 (FIG. 1). Each of the axles 305 protrude from the gear box 140. Within the gear box 140, the axle 305 is connected to the rear gear 143, such that rotation of the rear gear 143 results in rotation by the axle 305 which causes the mobility means 120 to become mobile.

Referring momentarily to FIG. 2, the toy bulldozer 100 is powered by a power source 50. According to one embodiment, the power source 50 is a plurality of dry cell batteries, connected in series. It is to be noted that the scope of the present invention is not limited by the type of power source 50, and the toy bulldozer 100 may be powered by other power sources. The power source 50 provides the electrical energy necessary to make the toy bulldozer 100 mobile, activate the blade 130 and the ripper 150, and turn on the headlights.

According to the invention, the bulldozer 100 is provided with a pair of kill switches that are coupled to the brake pedals 178 on the left side 111 and the right side 112 of the central body frame 110. The kill switches act as the primary control that allow the supply of power from the power source 50 to the gear box. When the brake pedals 178 are depressed, the kill switches are activated. Thus, when the brake pedal 178 on the left side 111 is pressed, the supply of power to the left gear box is terminated and the mobility means 120 on the left side 111 becomes static. On the other hand, when the brake pedal on the right side is pressed, the supply of power to the right gear box is terminated, and the mobility means 120 on the right side 112 becomes static.

When the two brake pedals 178 are pressed simultaneously, the toy bulldozer 100 comes to a complete halt. On the other hand, when only one of the brake pedals 178 is pressed, it halts the mobility means 120 on the matching side while allowing the mobility means 120 on the other side to remain mobile. As a result, the toy bulldozer 100 tilts to the side of the static mobility means 120 and turns in the like direction.

According to the invention, the toy bulldozer 100 is approximately 5 feet in length, 3 feet in height and 2.5 feet in width. However, it is possible to alter the size of the toy bulldozer 100 to accommodate children of larger sizes. The individual parts of the toy bulldozer 100 are to be constructed from a sturdy material, such as metal or hard plastic. It is possible to provide the toy bulldozer 100 in a variety of different colors, such as black, red or a combination of different colors.

In summary, herein disclosed is a power-operated mobile toy bulldozer 100 that seat a driver. The toy bulldozer comprises a central body frame 110 having a front portion 101 and a rear portion 103. The central body frame 110 has a seat 160, a pair of mobility means 120 mounting the central body frame 110, a movable blade 130 mounted on the front portion 101 of the central body frame 110, and a movable ripper 150 mounted on the rear portion 103 of the central body frame 110.

Many specific details contained in the above description merely illustrate some preferred embodiments and should not be construed as a limitation on the scope of the invention. Accordingly, many other variations are possible within the spirit of the present invention, limited only by the scope of the appended claims.

I claim:

1. A mobile toy bulldozer that seats a driver, comprising:
   a central body frame having a front portion, a rear portion, a left side and a right side, said central body frame having a seat in its center;
   a pair of mobility means on the left side and the right side of said central body frame, the mobility means mounted by a gear, the mobility means allowing the toy bulldozer to become mobile, said mobility means comprising:

a top end wheel mounted on an axle, the top end wheel having an inner portion, said axle mounted on the gear that mounts said mobility means, a pair of bottom end wheels, a closed-loop elastic track having a slotted strip on its inner surface, the closed-loop elastic track securely fitted on the top end wheel and the pair of bottom end wheels, and a plurality of rollers located between said pair of bottom end wheels, said plurality of rollers providing support to said closed-loop elastic track;

a pair of gear boxes of the left side and the right side of said central body frame, each gear box having a plurality of gears, the plurality of gears forming a gear train, one of said plurality of gears mounting said mobility means;

a movable blade mounted on the front portion of said central body frame, said blade capable of pushing objects;

a movable ripper mounted on the rear portion of said central body frame;

a power source on the central body frame to supply electrical power necessary to operate the mobile toy bulldozer; and a pair of brakes having brake shoes that press against the inner portion of the top end wheel of said mobility means.

2. The mobile toy bulldozer of claim 1, further comprising a pair of brake pedals connected to said brakes to selectively halt the mobility of said mobility means.

3. The mobile toy bulldozer of claim 2, further comprising:

a ripper lever to operate said movable ripper; and a blade lever to operate said movable blade.

4. The mobile toy bulldozer of claim 3, wherein said top end wheel and said pair of bottom end wheels have grooved bands, said grooved bands connecting with said slotted strip of the closed-loop elastic track.

5. A mobile toy bulldozer that is capable of seating one person, comprising:

a central body frame having a front portion, a rear portion, a left side and a right side, said central body frame having a seat in its center;

a pair of mobility means on the left side and the right side of said central body frame, the mobility means allowing the toy bulldozer to become mobile;

a pair of gear boxes of the left side and the right side of said central body frame, each gear box having a plurality of gears, the plurality of gears forming a gear train, one of said plurality of gears mounting said mobility means;

a movable blade mounted on the front portion of said central body frame, said blade capable of pushing objects;

a movable ripper mounted on the rear portion of said central body frame;

a pair of brakes having brake shoes that engage the mobility means;

a pair of brake pedals connected to said brakes to selectively halt the mobility of said mobility means; and a power source on the central body frame to supply electric power necessary to operate the mobile toy bulldozer.

6. The mobile toy bulldozer of claim 5, wherein the mobility means comprises:

a top end wheel mounted on an axle, said axle mounted on the gear that mounts said mobility means;

a pair of bottom end wheels;

a closed-loop elastic track having a slotted strip on its inner surface, the closed-loop elastic track securely fitted on the top end wheel and the pair of bottom end wheels; and a plurality of rollers located between said pair of bottom end wheels, said plurality of rollers providing support to said closed-loop elastic track.

7. The mobile toy bulldozer of claim 6, further comprising:

a pair of top arms and bottom arms mounted on the left side and the right side of the central body portion, said top arms and said bottom arms mounting said movable blade to said central body frame;

a front gear lift box mounted on the front portion of the central body frame, said front gear lift box connected to said top arms, the front gear lift box raising and lowering said movable blade by raising and lowering said top arms;

a worm shaft attached to the rear portion of said central body frame; and a ripper lift extending from said worm shaft, said ripper lift mounting said movable ripper.

8. The mobile toy bulldozer of claim 7, further comprising a pair of kill switches that cut off the supply of electrical power from said power source to said gear box for halting the mobility means mounted thereon.

* * * * *